US010541775B2

(12) United States Patent
Gavignet et al.

(10) Patent No.: US 10,541,775 B2
(45) Date of Patent: Jan. 21, 2020

(54) OPTICAL SIGNAL COMPRISING A SUCCESSION OF MULTI-BAND BURSTS OF MULTI-CARRIER DATA SIGNALS, SYSTEM AND METHOD OF EMISSION OF SUCH A SIGNAL, AND CORRESPONDING OPTICAL TRANSPORT NETWORK (71) Applicant: ORANGE, Paris (FR)

(72) Inventors: Paulette Gavignet, Tregastel (FR);
Erwan Pincemin, Gommenec'h (FR);
Esther Le Rouzic, Trebeurden (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/500,899

(22) PCT Filed: Jul. 25, 2015

(86) PCT No.: PCT/FR2015/052082
§ 371 (c)(1),
(2) Date: Jan. 31, 2017

(87) PCT Pub. No.: WO2016/020602
PCT Pub. Date: Feb. 11, 2016

(65) Prior Publication Data
US 2017/0230134 A1 Aug. 10, 2017

(30) Foreign Application Priority Data

Aug. 4, 2014 (FR) ...................... 14 57580

(51) Int. Cl.
*H04J 14/02* (2006.01)
*H04Q 11/00* (2006.01)
(Continued)

(52) U.S. Cl.
CPC ...... *H04J 14/0241* (2013.01); *H04L 27/0008* (2013.01); *H04L 27/2627* (2013.01);
(Continued)

(58) Field of Classification Search
None
See application file for complete search history.

(56) References Cited

U.S. PATENT DOCUMENTS

2004/0052525 A1* 3/2004 Ovadia ............. H04Q 11/0066
398/47
2007/0201868 A1* 8/2007 Aoki .................... G02B 6/2813
398/45
(Continued)

FOREIGN PATENT DOCUMENTS

EP     2693671 A1    5/2014

OTHER PUBLICATIONS

Pincemin Erwan et al., "Multi-Band OFDM Transmission at 100 Gbs With Sub-Band Optical Switching", Journal of Lightwave Technology, IEE Service Center, New York vol. 32, No. 12, Jun. 15, 2014, pp. 2202-2219, XP011550378, ISSN: 0733-8724.
(Continued)

*Primary Examiner* — David W Lambert
(74) *Attorney, Agent, or Firm* — Haverstock & Owens LLP (57) ABSTRACT The invention relates to a system for sending data in an optical network comprising source nodes (1-1, 1-2, 1-3, 1-4, 1-5), each capable of generating, in a spectral band that is associated with it, a multi-carrier optical data signal obtained by modulation of a source signal at a source wavelength and of sending this signal in the form of single-band data bursts (11-13, 21-23, 31-33, 41-43, 51-53) that can be associated with distinct source wavelengths, and a combiner (1,2) for combining single-band data bursts, sent by the source nodes in the spectral bands that are associated with them, into multi-band data bursts (61-63, 71-73) occupying a spectral band corresponding to a juxtaposition of the spectral bands associated with the source nodes. In this system, a unit for controlling an instant of sending of said
(Continued)

single-band data bursts by the source nodes, implements a control plane taking account of a path time of the single-band data bursts sent by the source nodes to the combiner.

17 Claims, 7 Drawing Sheets

(51) Int. Cl.
  *H04L 27/00* (2006.01)
  *H04L 27/26* (2006.01)
(52) U.S. Cl.
  CPC ..... *H04Q 11/0005* (2013.01); *H04Q 11/0066* (2013.01); *H04Q 2011/0016* (2013.01); *H04Q 2011/0018* (2013.01); *H04Q 2011/0086* (2013.01)

(56) References Cited

U.S. PATENT DOCUMENTS

| | | | | |
|---|---|---|---|---|
| 2009/0142056 A1* | 6/2009 | Bernstein | ............ | H04J 14/0227 398/49 |
| 2009/0226169 A1* | 9/2009 | Wei | ............ | H04J 14/0212 398/51 |
| 2012/0070147 A1* | 3/2012 | Mizutani | ............ | H04L 43/0852 398/25 |
| 2012/0093509 A1* | 4/2012 | Kazawa | ............ | H04B 10/272 398/58 |
| 2014/0255022 A1* | 9/2014 | Zhong | ............ | H04Q 11/0005 398/16 |
| 2015/0288480 A1* | 10/2015 | Khotimsky | ............ | H04Q 11/0067 398/68 |

OTHER PUBLICATIONS

Kaiser R. et al., "Optoelectronic/Photonic Integrated Circuits on INP Between Technological Feasibility and Commercial Success", IEICE Transactions on Elections, Institute of Electronics, vol. E85-C, No. 4, Apr. 1, 2002, pp. 970-981, ISSN 09163-8524, XP001117301.

Martin J. R. Heck et al., "Integrated Fourier-Domain Mode-Locked Lasers: Analysis of a Novel Coherent Comb Laser", IEE Journal of Selected Topics in Quantum Electronics, IEEE Service Center , vol. 18, No. 1, , Jan. 1, 2012.

Shiozawa t. et al., "Rapid Wavelength Switching", Electronics Letters, IEE Stevenage, vol. 29, No. 15, Jul. 22, 1993, pp. 1331-1332, XP000385658, ISSN: 0013-5194.

Ahmed Triki et al., "Efficient Control Plane for Passive Optical Burst Switching Network", pp. 535-540.

J.M. Fabrega, Experimental Demonstration of Elastic Optical Networking Utilizing Time Sliceable Bitrate Varianble OFDM Transceiver, OFC 2014, Optical Society of America.

Jan-Olof Wesstrom, "State-of-the-art performance of widely tunable modulated granting Y-branch lasers".

"Terminology for Sub-Lambda Photonically Switched Network (SLPSN)", , International Telecommunication Union, pp. 1-20, COM 15-C 2322 rev.1 E, Aug. 2012.

Enclosed please find a Search Report for the PCT/ FR2015/052082 application.

* cited by examiner

OPTICAL SIGNAL COMPRISING A SUCCESSION OF MULTI-BAND BURSTS OF MULTI-CARRIER DATA SIGNALS, SYSTEM AND METHOD OF EMISSION OF SUCH A SIGNAL, AND CORRESPONDING OPTICAL TRANSPORT NETWORK

1. FIELD OF THE INVENTION

The field of the invention is that of optical communications networks. More specifically, the invention relates to the improvement of the use of network resources in such optical networks.

2. PRIOR ART AND ITS DRAWBACKS

The exponential growth of the volume of data exchanged within optical communications networks is dictating a constant increase in the bit rates of transmission interfaces, now reaching 100 Gbit/s and more.

The downside of this increase in the bit rate of interfaces is that the filling of the transmission channels can be relatively inefficient if it is not done by electronic aggregation that is costly in terms of optical-electrical-optical (O-E-O) conversion interfaces and uneconomical in terms of energy.

However, there are two optical solutions that can be used to access the sub-wavelength granularity and thus lead to a better use of resources by filling the transmission channels more efficiently. The first solution uses the time domain: this is the solution using SLPSN (Sub-Lambda Photonically Switched Networks) as described especially in "Terms and definitions for Sub-Lambda Photonically Switched Networks", ITU, COM15-C2322 Rev.-E, Geneva, August 2012. The second solution uses the spectral domain. This is the multi-band OFDM (Orthogonal Frequency Division Multiplexing), as described especially by E. Pincemin et al., in "Multi-band OFDM Transmission with Sub-band Optical Switching,", Proc. ECOC 2013, invited paper Th.2.A.1 (2013).

2.1 SLPSN Solutions and their Drawbacks

SLPSN (Sub-Lambda Photonically Switched Networks) solutions have thus been identified as solutions that enable not only the efficient use of transportation resources but also as a solution for sharing interfaces in core and metropolitan networks in the optical domain.

This solution relies on the photon switching of temporal slices of wavelengths known as bursts, slots or more generally SLPS units (SLPSU). As a result, the SLPSN solutions are distinct from TDM (Time Division Multiplexing) techniques such as OTN/SDH (Optical Transport Network/Synchronous Digital Hierarchy) as well as packet (ATM or Asynchronous Transfer Mode), Ethernet, IP (Internet Protocol) and other techniques that carry out this switching in the electrical domain. They are also distinct from optical circuit switching (OCS) solutions which switch entire wavelengths for very long durations with slow switching/reconfiguration times (of the order of ten milliseconds).

Optical aggregation carried out with SLPSN solutions indeed makes it benefit from statistical multiplexing and thus obtain an efficient filling of the wavelengths.

The initial concept of optical burst switching (OBS) of data was introduced in 1999 by C. M. Qiao et al to compensate for the lack of flexibility of optical networks with circuit switching and the immaturity of optical packet switching techniques. This solution was especially impelled by the increase in traffic volumes and the generalization of IP traffic, resulting in an increasingly bursty traffic with a "packet" nature.

Contrary to optical packet switching, the OBS technique consists in gathering together a certain number of packets, intended for a same end node, in a single burst. This way of operating gives bursts of a longer duration than native IP packets and thus relaxes the technical constraints (processing speed) at the level of the nodes. Since the duration of the bursts remains low (from a few microseconds to a few milliseconds), the OBS technique benefits from significant statistical multiplexing which improves the filling of the channels. From this viewpoint, the OBS technique is an efficient compromise between technical complexity and performance. However, contrary to electronic switching, the OBS technique does not benefit from the possibility of having optical memories and circumvents this problem either by using methods of burst contention management or by very precisely controlling the sending periods at the sources.

In addition to the capacity of the optical bursts to improve the efficiency of the transportation networks, it is hoped that the SLPSN techniques will provide a sharp reduction in electrical consumption by these networks. This reduction is warranted by the fact that ideally, the data bursts are directed in the SLPN networks without any electronic processing and that only the control packets are processed therein if necessary.

Numerous variants and offshoots derived from the original OBS notion have been proposed in the literature. One relevant criterion for classifying the different variants of the OBS techniques is their capacity to transmit with or without losses of bursts.

The solutions that prohibit the loss of bursts are the only ones that offer a satisfactory level of transportation quality to attain performance compatible with the requirements of an operational network.

Among the most promising solutions, the one based on passive TWIN (Time-domain Wavelength Interleaved Networking) routing as described in the article by A. Triki et al., "Efficient control plane for passive optical burst switching network", ICOIN 2013, pp. 535-540, combines wavelength directing and planning of access to the wavelength. Wavelength directing is based on the pre-configuration of color trees. The directing of a burst is for example carried out by coloring it, when it is sent, on the wavelength corresponding to the tree to be travelled on. The burst is thus directed or branched out towards the root (or destination) of the tree. This directing or branching out technique makes it possible to avoid fast switching devices in the nodes crossed (core nodes of the network) while the programming of the allocations of the wavelengths to the trees enables the efficient use of the optical resources (transmitters, receivers, wavelength channels) without any loss of collision.

More generally, there are two main solutions for the lossless implementing of OBS solutions.
- tuning at source: in this case, a wavelength is associated with a destination and the source sends out its SLPSU time unit at the wavelength of the destination with which it wishes to communicate,
- tuning at reception: in this case, the source sends out its SLPSU time units always at the same wavelength and it is each receiver that tunes into the wavelength of the SLPSUs intended for them.

In general, each source node is also a destination node; the size of the network (the number of sources/destinations) is therefore limited by the number of wavelengths traveling in the network. The WDM (Wavelength Division Multiplexing) transmission systems currently used in networks transport about 80 wavelengths. This number can be increased slightly by using C transmission bands (conventional transmission bands ranging from 191.560 to 195.942 THz) in conjunction with L transmission bands (long-wave bands from 184.487 to 191.560 THz) or by reducing the spacing between channels. This second solution however is limited by the fact that with the bit rate increasing, the bandwidth of the channels possesses a minimum value that is non-compressible.

Furthermore, the minimum duration and therefore the quantum of data transmitted in an optical burst is of the order of several microseconds given the time for reconfiguring the different elements needed for sending the burst (tunable laser, receiver in burst mode, etc.). At present, for a bit rate of 100 Gbit/s for example, the number of bits in a 4.5 µs burst is 45,000 (i.e. 5625 bytes). This represents several Ethernet frames. It is therefore necessary to build a burst by placing the packets of frames that have to constitute the burst in queues. Depending on the way in which the bursts are assembled (taking into account quality of service, whether or not there is fragmentation, whether the size of the bursts is fixed or variable, etc.), the building of the burst leads to a latency of the packets/frames. This has a negative impact on the services offered and especially the real time-services. It would therefore be interesting to be able to send for example a single Ethernet frame (or a single data packet) per burst with an adaptation of the format of the burst to the format of the Ethernet frame (or of the data packet). This could indeed make it possible to more efficiently fill the burst (i.e. prevent gaps during the constitution of the burst with Ethernet frames) or prevent the fragmentation of the frames over several bursts (fragmentation is indeed a solution used to completely fill the bursts but requires complex mechanisms to label the pieces of bursts/packets distributed in different bursts and reconstitute the frames/packets from these pieces).

Increasing the bit rates of the interfaces to 100 Gbit/s or even more (required by the need to increase the capacity per fiber) will make this container far bigger (with bursts containing more than 56,000 bytes) further increasing these questions of latency and filling of the bursts.

There is therefore a need for an OBS type technique making it possible to attain lower granularity than the bursts.

2.2 Multi-Band OFDM Technology and its Drawbacks

Another solution for accessing sub-wavelength granularity is to use the multi-band Orthogonal Frequency Division Multiplexing (MB-OFDM) modulation format constituted by different independent frequency bands which can be routed in a separately meshed network. The US patent application US 2009/226169 A1 (Wei Wei et al.) describes an optical network architecture implanting such a modulation format.

Multi-band OFDM technology consists in juxtaposing the spectral bands corresponding to several independent OFDM multi-carrier signals, so as to transport higher bit rates than what would be allowed by a single-band technology. Each OFDM signal is constituted by several hundreds of sub-carriers (128, 256, 512, . . . ).

Figure 1:
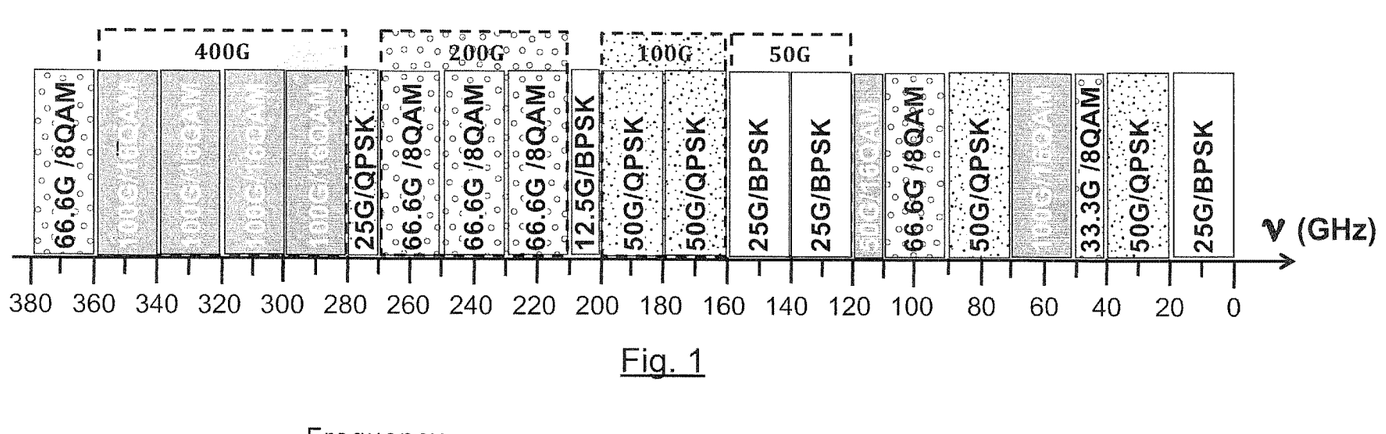
FIG. 1, already described with reference to the prior art, presents an example of management of the spectrum of an optical fiber with MB-OFDM technology.

FIG. 1 presents an example of management of the optical spectrum using multi-band OFDM technology.

In this example, each band is independent and is generated by its own transmitter. It is possible to group together all these bands in one super channel, because they start from the same starting point and go towards a same destination. The width of the OFDM signal and the modulation carried by the sub-carriers constituting the OFDM signal can be chosen according to the capacity and the range aimed at. For example BPSK modulation (Binary Phase Shift Keying modulation) has a very great transmission range but a low spectral efficiency, whereas on the contrary 16-QAM (Quadrature Amplitude Modulation) has limited range but very high spectral efficiency.

Today, with WDM Nyquist technology (in which Nyquist filtering is applied to a WDM channel so as to make its spectrum rectangular and so as to be therefore able to compact the channels more densely), the highest spectral efficiency is obtained with 16-QAM modulation which enables 200 Gbit/s to be transported in a 37.5 GHz bandwidth. This spectral efficiency results from a compromise between transported capacity and robustness in relation to the accumulation of amplified spontaneous emission (ASE) noise and the non-linear effects of propagation in the fiber (the Kerr effect which gives rise to self-phase modulation (SPM), cross-phase modulation (XPM) and four-wave mixing (FWM). With OFDM technology, as illustrated in FIG. 1, it is possible to think of making 100 Gbit/s pass through a 20 GHz bandwidth with 16-QAM modulation for example in the spectral sub-bands ([280 GHz; 300 GHz], [300 GHz; 320 GHz], [320 GHz; 340 GHz], [340 GHz; 360 GHz]), which generates more or less the same maximum spectral efficiency as the Nyquist-WDM technology.

At reception, each band of the multi-band OFDM signal can then be extracted from the total (multi-band) signal using highly selective optical filters. However, these filters have a bandwidth granularity of the order of 10 GHz. This value of 10 GHz represents a limit of what is hopefully attainable in the coming ten years. As illustrated in FIG. 1, a spectral slot of 10 GHz can typically transport 12.5 Gbit/s (in QPSK) to 25 Gbit/s (in 16-QMA). This can still be far too high to carry out an efficient filling of this band. Achieving finer granularity would therefore provide greater flexibility in the allocation of transportation resources.

2.3 Another Solution and its Drawbacks

In the article "Experimental demonstration of Elastic Optical Networking utilizing Time-Sliceable Bitrate Variable OFDM Transceiver" in Proc. OFC, 2014, paper Tu2G.8, J. M. Fabrega et al., propose a solution for improving the use of resources in an optical network by carrying out a time slicing in an OFDM signal for short-range applications so as to obtain sub-wavelength granularity. The time units of the OFDM signal are routed in the network by means of optical switches.

While this solution is interesting in that it proposes the simultaneous use of the spectral and time domains to adapt the allocated bandwidth according to the bandwidth required for data transmission, it has little flexibility in the management of the resource. In addition, it relies on a fast switch-based routing technique which is not economical in energy.

There is therefore a need for a technique to resolve these different drawbacks of the prior art.

3. SUMMARY OF THE INVENTION

The invention responds to this need by proposing a system for sending data in an optical network comprising a plurality of optical nodes that comprise:

a plurality of source nodes, a source node being capable of generating, in a spectral band that is associated with it, a multi-carrier optical data signal (OFDM) obtained by modulation of a source signal at a source wavelength and of sending said multi-carrier optical data signal in the form of single-band data bursts that can be associated with distinct source wavelengths, a module for combining said single-band data bursts, sent by said source nodes in said spectral bands that are associated with them, into multi-band data bursts occupying a spectral band corresponding to a juxtaposition of said spectral bands associated with the source nodes.

In addition, such a system comprises at least one unit for controlling an instant of sending of said single-band data bursts by said source nodes, implementing a control plane taking account of a path time of said single-band data bursts sent by said source nodes to said combination module.

Thus, the invention relies on a wholly novel and inventive approach to the use of transmission sources in an optical network to attain the finest possible sub-wavelength granularity. Indeed, the invention advantageously proposes to combine the temporal solution for achieving sub-wavelength granularity as proposed for example by the OBS technique, in using optical data bursts, and the spectral solution for achieving sub-wavelength granularity as offered for example by the MB-OFDM technology in using a juxtaposition of spectral bands corresponding to independent OFDM signals.

Thus, according to one embodiment of the invention, each of the source nodes of the system is associated with a spectral band and sends out data bursts in this band. These data bursts are built by time slicing of an OFDM-type multi-carrier signal obtained by multi-carrier modulation of a colored source signal on which the digital data to be transmitted are imprinted. The wavelength of the source signal and therefore the color of the signal can vary from one data burst to the next, depending for example on the destination node for which the data are intended. Each of the source nodes then sends single-band OFDM data bursts in independent spectral bands.

In addition, such a system also comprises a combination module, or band combiner, that receives all the single-band data bursts coming from the source nodes and the pairs of multi-band OFDM data bursts.

In order that these MB-OFDM data bursts be perfectly configured at the band combiner, a control architecture relying on a specific control plane enables control of the instants at which the single-band bursts are sent by the different source nodes so that they simultaneously reach the band combiner to be combined therein into multi-band bursts. Such a control plane relies on precise knowledge of the path time of the single-band data bursts in the optical network between each of the source nodes and the band combiner. It furthermore makes it possible, as in the TWIN techniques for example, to avoid collisions in the optical network and to manage contentions within the network and at the destination nodes. Such control architecture can be centralized or distributed.

According to a first aspect of the invention, for a given source node, said single-band data bursts are of variable duration.

Thus great flexibility is obtained in the management of resources in a spectral band, in reserving for example several successive time units when sending a data burst of greater duration.

According to another aspect of the invention, for a given source node, said single-band data bursts can be associated with multi-carrier optical data signals having different modulation formats.

According to yet another aspect of the invention, for a given source node, said single-band data bursts can be associated with different data transmission bit rates thus enabling more precise management of the network resources and enabling efficient matching of bandwidth requirements.

The flexibility in terms of choice of modulation (bit rate and format) for each OFDM band and within the OFDM signal itself offers a multiplicity of combinations enabling the quantity of resources used to be perfectly adapted to the quantity of data to be transported and to goals in terms of range (in distance).

According to yet another aspect of the invention, said source wavelength associated with a single-band data burst is a wavelength dedicated to a destination node of said single-band data burst.

In this embodiment, the system of the invention relies on an operation of directing in the optical network according to the wavelength, implementing a tuning at source. A wavelength is associated with a destination and the source node sends out its burst of data at the wavelength of the destination with which it can communicate.

As an alternative, in another embodiment, the system of the invention relies on tuning at reception. In this case, the source node always sends out its data bursts at the same wavelength and it is each destination node that gets tuned to the wavelength of the data bursts that are intended for it.

According to one particular embodiment, one of said source nodes comprises a tunable laser, preferably a high-speed tunable laser (with a wavelength-changing time of less than 100 ns), having a very low phase noise (with a spectral emission line width of less than 100 kHz).

According to another particular embodiment of the invention, one of said source nodes comprises at least two external cavity lasers each generating a source signal at a predetermined source wavelength that is proper to it and at least two optical switches having an optical gate function at output of said external cavity lasers capable of temporally sub-dividing said source signals.

Indeed, the use of external cavity lasers having very low phase noise is particularly suited to the technology of OFDM multi-carrier modulation which is highly sensitive to phase noise prompting interference between sub-carriers (ICI or inter-carrier interference). In addition, the use of such lasers pre-set on certain wavelengths and associated with optical switches having low response times (for example semi-conductor amplifiers used as optical gates) constitutes an interesting alternative to rapidly tunable lasers with very low phase noise. The advances being made in optical integration should furthermore make it possible, in the near future, to make this assembly on a single component.

According to one particular aspect of this embodiment, said external cavity lasers are common to at least two of said source nodes thus advantageously making it possible to pool the sources on the sending side.

According to another embodiment of the invention, said spectral band associated with one of said source nodes is variable so as to offer an additional degree of freedom in the flexibility offered to adapt the granularity of the bandwidth used to the quantity of data to be transported. In this case, the control plane must also make it possible to control the allocation of the spectral bands to the different source nodes.

Such a control plane advantageously implements an exchange of messages between the different optical nodes (source nodes, destination nodes, intermediate nodes) and the control unit, which can be centralized or distributed.

According to one embodiment in which the bandwidth used by a source node is not adaptable, said at least one control unit comprises means for computing a duration of said single-band data bursts from a piece of information on spectral bandwidth associated with one of said source nodes inserted into a message exchanged between said source node and said control unit. The information comprises for example the optical carrier number as well as the parameters of the OFDM modulation (number of sub-carriers, modulation format, cyclic prefix, etc.).

According to another embodiment, the sending by a source node on a given band can have sending characteristics, or parameters, different from one burst to another. This matching of the transmission characteristics can be done at the initiative of the control unit, the initiative of the source node itself, or the initiative of a destination node.

In this embodiment, the control unit comprises means for computing said instant of sending from these parameters of transmission of a single-band data burst by one of said source nodes, said parameters of transmission being contained in at least certain of said exchanged messages. These messages can be request messages transmitted by the source node to the control unit, grant messages transmitted by the control unit to the source node, messages transmitted by the control unit to the destination nodes or again command messages transmitted by a destination node to a source node or the reverse.

According to another embodiment, since the width of the spectral band associated with one of said source nodes is variable, the control plane comprises command messages sent to at least one intermediate node of the network comprising a piece of information on a current bandwidth for said source node. Such command messages are used to inform the intermediate nodes of the network (for example a band-separating node capable of converting the multi-band data burst into a plurality of single-band data bursts) about the settings to be taken into account in terms of bandwidth during a given period of time.

The different embodiments and characteristics presented above with reference to the system of sending of the invention can be combined wholly or in part. It is possible especially to envisage a case where the data bursts have modulation formats and bit rates that are different from burst to burst, as well as different source wavelengths, on a same spectral band.

The invention also relates to a method for sending data in an optical network comprising a plurality of optical nodes that comprises:
- at least two steps for the generating, in two independent spectral bands, of a multi-carrier optical data signal obtained by modulating a source signal at a source wavelength;
- at least two steps for sending said multi-carrier optical data signal in the form of single-band data bursts that can be associated with distinct source wavelengths;
- a step for combining said single-band data bursts into multi-band data bursts occupying a spectral band corresponding to a juxtaposition of said independent spectral bands;
- a step for controlling an instant of sending said single-band data bursts, implementing a control plane taking account of a path time of said single-band data bursts between said sending steps and said combination step.

Such a method of sending presents a combination of all or part of the characteristics explained above with reference to the system for sending according to the invention.

The invention also relates to an optical network comprising:
- a plurality of source nodes,
- a source node being capable of generating, in a spectral band associated with it, a multi-carrier optical data signal obtained by modulation of a source signal at a source wavelength and of sending said multi-carrier optical data signal in the form of single-band data bursts capable of being associated with distinct source wavelengths,
- at least one module for combining said single-band data bursts, sent by certain of said source nodes in said spectral bands associated with them, into multi-band data bursts, occupying a spectral band corresponding to a juxtaposition of said spectral bands associated with the source nodes,
- means for controlling an instant of sending of said single-band data bursts by said source nodes, implementing a control plane taking account of a path time of said single-band data bursts sent by said source nodes to said at least one combination module;
- At least one core node for the passive routing of said multi-band data bursts, capable of directing said multi-band data bursts as a function of said associated source wavelengths;
- At least one band separator module, capable of separating said multi-band data bursts into a plurality of single-band data bursts and of directing said single-band data bursts as a function of their associated source wavelength towards a destination node to which said source wavelength is dedicated;
- A plurality of destination nodes of said single-band data bursts.

Such an optical network comprises, in addition to a set of source nodes and destination nodes, stages of aggregation of the single-band data bursts into multi-band data bursts (band combination modules or band combiners nodes for routing multi-colored bursts travelling through the core of the network and nodes for routing by bands (band-separator module).

Such an optical network advantageously relies on an architecture used for lossless SLPSN solutions based on wavelength routing, with passive core nodes that do not implement any O-E-O conversion (optical-electrical-optical conversion) and are therefore energy-saving nodes.

Such an optical network combines all or part of the characteristics explained throughout this document, and especially here above, with reference to the transmission system of the invention.

The invention also relates to an optical signal capable of being transmitted in an optical transportation core network, that comprises a succession of multi-band data bursts, a multi-band data burst corresponding to a combination of single-band data bursts sent out in independent spectral bands,
a single-band data burst transporting a multi-carrier optical data signal obtained by modulation of a source signal at a source wavelength,
said single-band data bursts of a same spectral band being capable of being associated with distinct source wavelengths.

3. LIST OF FIGURES

Other aims, characteristics and advantages of the invention shall appear more clearly from the following description given by way of a simple illustrative and non-exhaustive example with reference to the figures, of which.

4. DETAILED DESCRIPTION OF EMBODIMENTS OF THE INVENTION

The general principle of the invention relies on the combination of two time and spectral solutions for accessing the sub-wavelength granularity in an optical transmission network, that makes it possible to scale up the capacity of the networks by offering the finest possible granularity, while at the same time enabling an increase in the bit rate per channel up to one terabit/s (or even beyond) and offers increased flexibility as compared with prior-art techniques.

Figure 2:
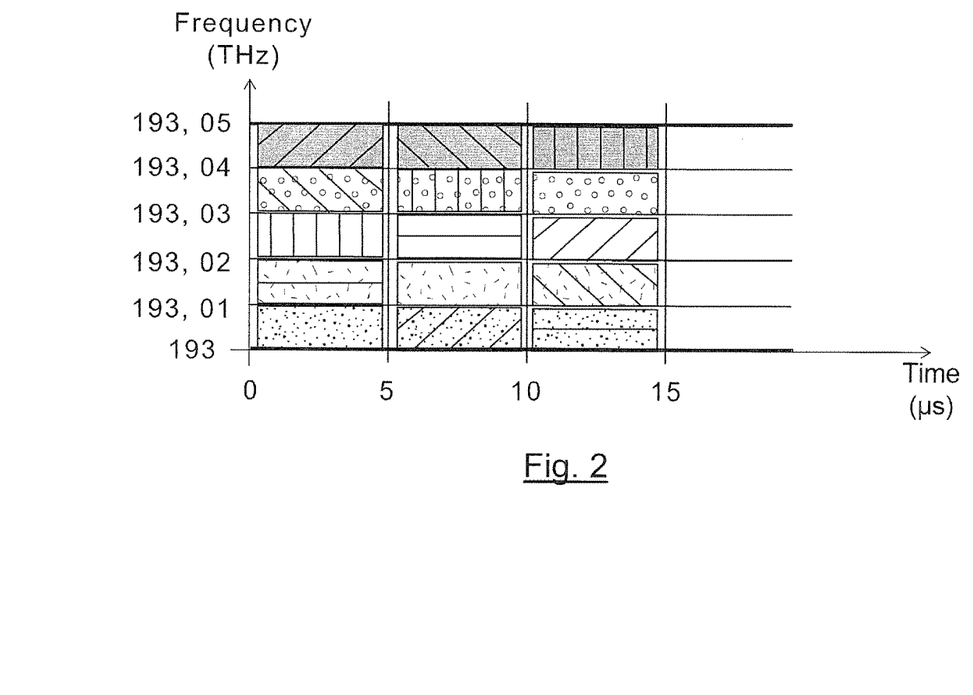
FIG. 2 presents the general principle of the sub-dividing of the transmission channel in the time and spectral domains according to one embodiment of the invention.

Referring to FIG. 2, we now present an example of a representation of a transmission channel sub-divided according to the general principle of the invention explained above, namely:

time sub-division by data bursts (in FIG. 2, the data bursts have a duration of 4.5 μs for a slot duration of 5 μs for example) and a spectral sub-division by bands (10 GHz, five bands being illustrated in FIG. 2 to form a 50 GHz channel).

In FIG. 2, each of the background patterns (shaded, with small circles, dots, etc.) corresponds to a different spectral band of the OFDM multi-band signal and the hatched portions (with oblique, vertical and horizontal lines, etc.) correspond to different contents in the different bursts constituted by this sub-division. The figure shows five spectral bands, namely:

a first spectral band [193 THz; 193,01 THz];
a second spectral band [193,01 THz; 193,02 THz];
a third spectral band [193,02 THz; 193,03 THz];
a fourth spectral band [193,03 THz; 193,04 THz];
a fifth spectral band [193,04 THz; 193,05 THz].
The figure also shows three time slots, namely:
a first time slot from 0 to 5 μs;
a second time slot from 5 to 10 μs;
a second time slot from 10 to 15 μs.

In the example of FIG. 2, the quantum of data is constituted by a signal occupying a 10 GHz spectral band and a 4.5 μs duration.

Thus, as compared with the prior-art MB-OFDM technique, the OFDM multi-band channel is sub-divided into time slots (also called bursts) which can have a variable duration (varying between some microseconds and some milliseconds); similarly, in the frequency domain, the burst which occupied a 50 GHz spectral band in the prior-art OBS technique has its spectral band, and therefore its transmission capacity, reduced by a factor equal to the number of bands constituting the OFDM multi-band channel. The quantum of capacity obtained by the prior-art OBS technique is therefore divided, in one embodiment of the invention, by the number of bands constituting the spectral channel.

In this embodiment of the invention, the quantum of capacity is then equivalent to the one that could have an optical packet of a duration several times smaller than the burst of the OBS technique (five times smaller in the example of FIG. 2). For example, the embodiment illustrated in FIG. 2 makes it possible to obtain the equivalent of a capacity for a packet with a duration of 0.9 μs in a traditional spectral band of 50 GHz.

It is important here to note that OFDM modulation applied to optics contributes not only to precision of management of the spectrum in its multi-band version but also to the possibility of adapting with precision to the transmission channel. Indeed, flexibility in terms of choice of modulation (bit rate and format) for each OFDM band and within the OFDM signal itself offers a multiplicity of combinations enabling the quantity of resources used to be perfectly adapted to the quantity of data to be transported and to the goals in terms of range (distance). It must also be noted that an OFDM multi-band signal contains several optical bands, each optical band corresponding to a laser emission wavelength and being capable of containing several electrical sub-carriers for one optical carrier.

Figure 3:
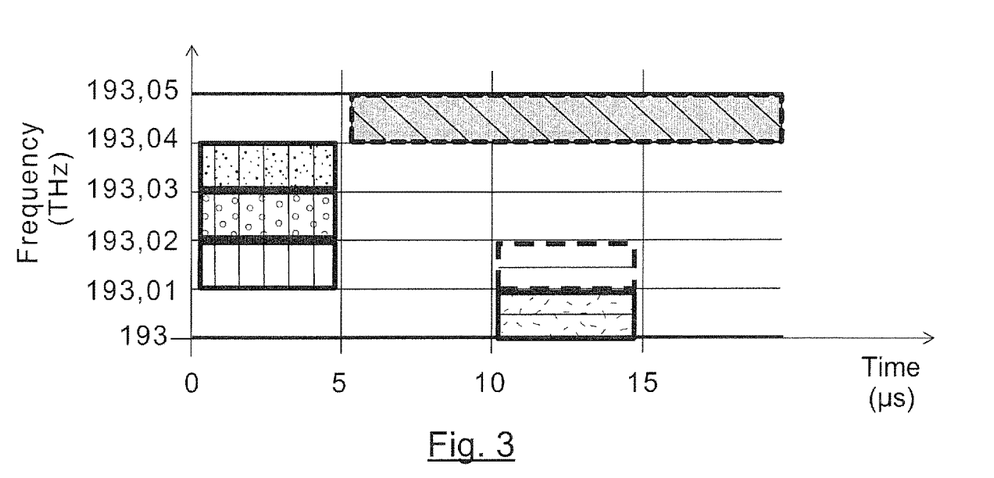
FIG. 3 illustrates an example of distribution of the data in time slots and the spectral bands according to one embodiment of the invention.

FIG. 3 illustrates an example of a possible distribution of data in slots and bands in one embodiment of the invention. Thus, it is possible to occupy several time slots (bursts) in one spectral band as illustrated by the rectangle with a shaded pattern and oblique hatchings. It is also possible to have one data burst distributed over several OFDM bands as illustrated by the block with vertical hatched lines, combining three single-band bursts respectively having a background pattern that is blank or consisting of small circles and dots: this makes it possible, for example to broadcast a same content to several recipients.

More generally, it is possible to use a quantum of data and a combination of quanta of data along the temporal and/or spectral axes. Besides, it is possible to adjust the bit rate within the quantum of data (represented in FIG. 3, by way of an example, by the lines around the time-frequency blocks: solid lines for a 10 Gbit/s bit rate, bold dashes for the 25 Gbit/s bit rate and thinner dashes for the 50 Gbit/s bit rate).

Thus, the combination of the two time and spectral domains proposed in this embodiment of the invention makes it possible to:

have smaller quanta of data than in the prior art (like those of the technique of optical switching by OPS packets) without however being subjected to the same technical constraints of the optical components, especially in terms of processing speed;

having a very-high-capacity network (owing to very high bit rates that can be attained with the OFDM multi-carrier modulation technique) with access to very fine granularity (through the use of bursts) and very high flexibility in resource management (variable bit rates and modulation formats, the possibility of bursts of variable duration);

the possible use of network architectures used for lossless SLPSN solutions (which are based on routing according to wavelength) with passive core nodes (without optical/electrical/optical conversion) and therefore economical in energy consumption;

the making of architectures for networks covering both "metro" applications and "access" to the core of the network;

a greater number of source nodes and/or destination nodes for the prior-art SLPSN solutions (multiplication by a factor equal to the number of spectral bands possible), each band being capable of being associated with a destination node. In addition, a destination node can have access to several spectral bands of the transmission channel if it needs high bit rate.

Figure 4:
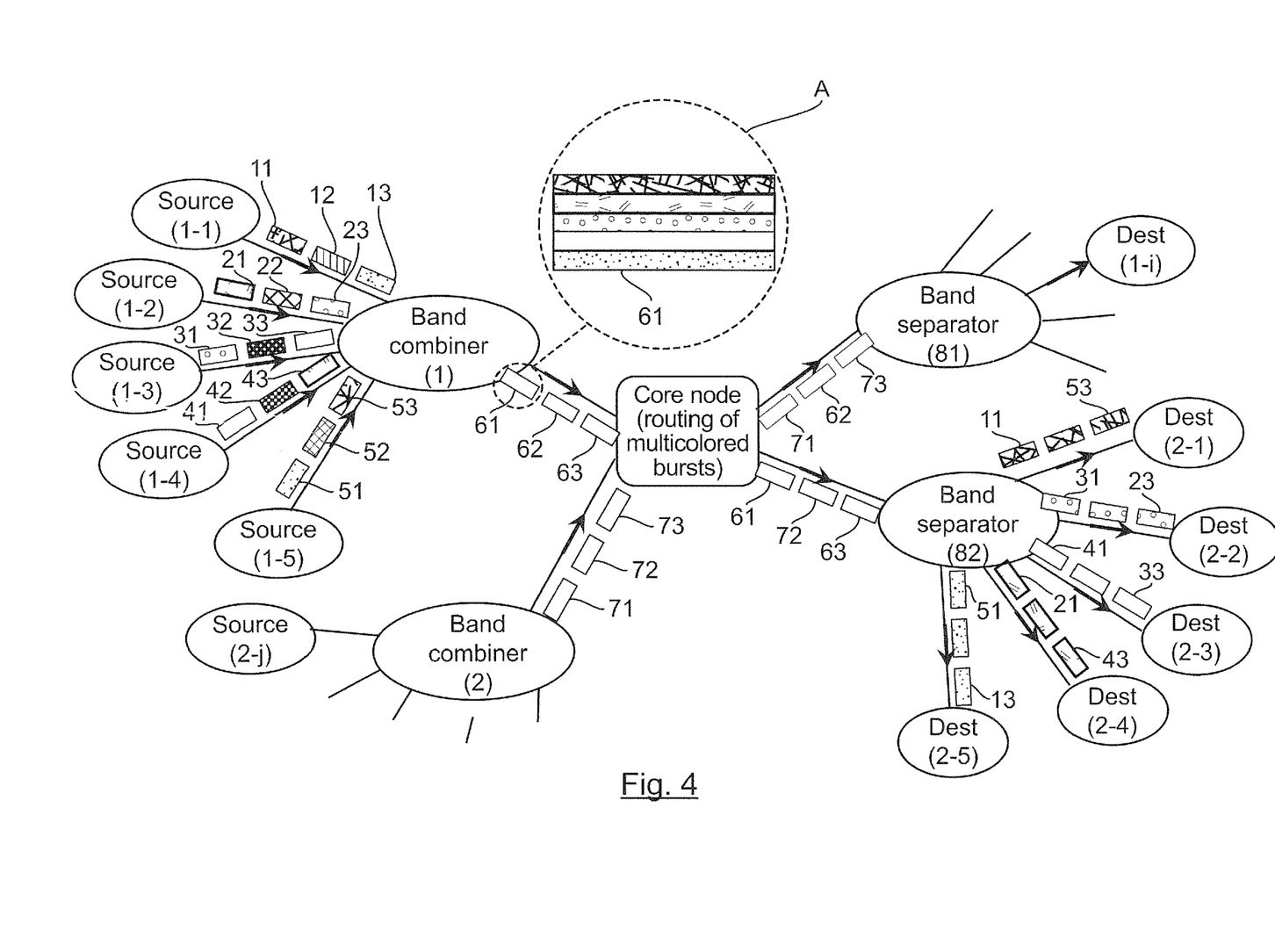
FIG. 4 presents an example of an optical network according to one embodiment of the invention relying on a wavelength routing TWIN architecture.

Referring now to FIG. 4, we present an example of an optical network according to one embodiment of the invention. Such an optical network comprises a set of source nodes, of which the figure more particularly represents, by way of an example, sources referenced 1-1, 1-2, 1-3, 1-4, 1-5 and 2-*j*. Each of these sources puts out OFDM single-band data bursts, of which three have been represented schematically for each source.

Thus, the source referenced 1-1 sends three successive OFDM single-band bursts respectively referenced 11, 12 and 13; the source referenced 1-2 sends three successive OFDM single-band bursts referenced 21, 22, 23; the source referenced 1-3 sends three successive OFDM single-band bursts referenced 31, 32, 33; the source referenced 1-4 sends three successive OFDM single-band bursts referenced 41, 42, 43; the source referenced 1-5 sends three successive OFDM single-band bursts referenced 51, 52, 53.

For a given source, the successive bursts can have different source wavelengths as illustrated schematically by the different background pattern for each of these bursts, which represents a different coloring of the sent signal. It is possible of course to envisage a case where a data source emits all the data bursts at the same source wavelength. It is also possible, in the OFDM single-band data burst sent out by a source, to have an alternation between successive bursts having a same source wavelength and bursts having distinct source wavelengths.

Each of the sources 1-1 to 2-*j* is associated with a spectral band that is proper to it at a given instant. The spectral bands of the sources referenced 1-1 to 1-5 are preferably independent. As will also be seen below in this document, it is also possible to obtain variations in the spectral band associated with a source.

The network of FIG. 4 also comprises two routing elements referenced 1 and 2 and called band combiners. Thus, the band combiner 1 receives the single-band data bursts 11-13, 21-23, 31-33, 41-43, 51-53 coming from the source nodes 1-1 to 1-5 and combines them into OFDM multi-band data bursts referenced 61 to 63. For the sake of simplifying the diagram of FIG. 4, these bursts 61 to 63 have been represented with a blank background pattern but it must be understood that each of these bursts corresponds to the juxtaposition of OFDM single-band bursts received from the sources 1-1 to 1-5 as illustrated by the zoom A on the OFDM multi-band data burst 61. It can thus be noted that the burst 61 occupies a spectral band obtained by juxtaposition of the spectral bands of the bursts 11, 21, 31, 41 and 51 and corresponds to a combination of these five single-band bursts.

In other words, the network elements called "band combiners" combine (by means of passive couplers) the N (here N=5 for the element 1) OFDM bands that constitute the OFDM multi-band channels.

In order to avoid collisions in the network and carry out a correct recombination of the OFDM multi-band channels in the "band combiner", an elaborate control plane must be implemented.

This control plane is constituted by control units for the equipment (especially source nodes), the control channel that interconnects them and the messages exchanged on this control channel. This control plane takes account of the path times between elements of the network, for example by a mechanism for external synchronization and exchange of time stamps or by a ranging (updating) process.

This control plane implements exchanges of messages between the source nodes, the destination nodes and the control nodes to provide information about the communications needs of the source nodes, the occupancy of the receivers in the destination nodes or the source nodes. For example, by means of a periodic sending of reports to the control unit (centralized or distributed), the source nodes get information on the state of their queues while the control units inform the source nodes of the dates at which they can send towards the destination nodes. In another example, the control unit receives a request for bandwidth between several elements of the network by means of control plane from a customer device (for example a GMPLS or Generalized Multi-Protocol Label Switching request coming from the routers).

Such a control plane can be implemented in a centralized control unit controlling the scheduling of the data bursts addressed to all the destination nodes. Such a control unit manages all the reservations by assigning each source node resources to be used to transmit data bursts to any unspecified destination.

As an alternative, such a control plane can be implemented in a control unit distributed in the network, which informs the source nodes about the instants at which they must send, using a "requests and grants" mechanism.

The control unit or units, whether centralized or distributed, implement computation algorithms to determine the dates of sending and receiving and assign grants with messages of authorization for sending to the source nodes.

This control plane must know the path time between the different network elements so as to decide on the appropriate points in time for sending OFDM single-band bursts.

With the framework of the invention, it is relatively important, in comparison with a classic TWIN network, to add a particular dimension to the control plane enabling management of the source nodes so that they allocate the time slots of the bursts as efficiently as possible and of the OFDM bands so that the MB-OFDM bursts are perfectly combined in the band combiners 1 and 2 of FIG. 4.

Thus, in a first embodiment where the bandwidth used by the source node is not adaptable, a piece of information on this bandwidth is inserted into the messages between the source node and the control unit.

This piece of information comprises for example the optical carrier number but also comprises information on the number of sub-carriers, the modulation format, the parameters related to the FEC and as the case may be other pieces of information linked to the OFDM embodiment such as cycling prefixes, pilot sub-carriers, learning symbols, etc.

This information enables especially the control unit to compute the duration of the bursts. The control unit can also use this information to inform a destination node in reception about the type of OFDM signal that it must receive and the date on which it must receive it so that the receiver of the destination node can, if necessary, adjust its parameters in preparation for reception. In this case, the control plane includes messages known as "setting messages" sent by the control unit to the destination node, this message comprising parameters for setting at reception.

In another embodiment, the sending by a source node on a given band can have transmission characteristics that are different (in terms of numbers of sub-carriers, modulation format, polarization and bit rates) from one burst to another and this can be the case for a same destination node or for different destination nodes. The control unit can originate the changes in the main characteristics, for example to take account of variable conditions of transmission or to adjust the bit rate to the load.

In this case, the request messages integrate the parameters enabling the control unit to carry out its authorization computations, especially with regard to the sending date but also the bit rate, the modulation format, the polarization, the sub-carriers, etc. The authorization messages also integrate these parameters so that the adaptation of the bursts is done according to computations of the control unit. Finally, additional messages can advantageously be transmitted to the destination nodes so that their receivers can adapt as a function of these parameters.

In another embodiment, the control unit is not at the origin of the adaptation of the characteristics of transmission between different bursts of a same node. This adaptation can then be initiated by the destination node towards the source nodes in order to improve transmission quality. Specific command messages (with the above parameters) are also transmitted from the destination node to the source nodes to implement this adaptation. It is also possible to envisage a case where this adaptation is controlled from a source node transmitting such specific command messages to the destination nodes.

Finally, in another embodiment, the source nodes are capable of temporarily modifying the width of the spectral bands on which they send at a given point in time. In addition to negotiating this width which can be done at the initiative of another element of the network (source node, destination or control node) as described above, the control plane then advantageously integrates command messages sent to the intermediate nodes of the network (e.g. the band separator nodes) in order to inform them of the settings to be taken into account in terms of bandwidth so that these intermediate nodes can modify the spectral width of a band transmitted by these nodes during a given period of time.

The MB-OFDM data bursts coming from the band combiners 1 and 2 are then routed up to a core node which is a node for routing OFDM multi-band bursts, referenced 7; such a core node is similar to the nodes used in the prior-art TWIN solution. Indeed, in the embodiment of the invention illustrated in FIG. 4, the optical infrastructure for the transportation and routing can be the same as that of another classic TWIN solution as described especially by A. Triki, et al. in "Efficient control plane for passive optical burst switching network", ICOIN 2013, pp. 535-540. Such core nodes 7 can be constituted by demultiplexers with a preset spectral plan or else by wavelength selective switches (WSS) so as to enable a (slow) reconfiguration of the network especially in the case of protection.

Such core nodes 7 direct the MB-OFDM bursts according to their color, i.e. their wavelength. Thus, among the bursts 61, 62 and 63 received from the combiner 1, the bursts 61 and 62 are branched out towards a band separator 82 to serve a set of destination nodes 2-1 to 2-5 and the burst 62 is branched out towards a band separator 81 to serve a set of destination nodes 1-$i$. Similarly, among the bursts 71, 72 and 73 received from the band combiner 2, the bursts 71 and 73 are routed towards the band separator 81 and the burst referenced 72 is routed towards the band separator 82.

Such band separators 81 and 82 are constituted by highly wavelength-selective filters (with a bandwidth of 10 GHz for example) used in OFDM multi-band solutions. These filters can be implemented using a "free space optics" technology (with monochromatic diffraction grating) or else a more compact LCos (Liquid Crystal on Silicon) type technology combining a diffraction grating and LCos pixel matrix for the branching out, these technologies being extensively used by in present-day industrial firms.

At output of the band separators 82, each of the MB-OFDM bursts 61, 72 and 73 is again separated into five OFDM single-band bursts which, depending on their wavelength, are branched out towards one of the destination nodes 2-1 to 2-5. We thus find the bursts referenced 11 and 53 directed towards the receiver 2-1; the bursts referenced 31 and 23 directed towards the receiver 2-2, the bursts referenced 41 and 33 directed towards the receiver 2-3; the bursts referenced 21 and 43 branched out towards the receiver 2-4; the bursts referenced 51 and 53 branched out towards the receiver 2.5.

Thus, in FIG. 4, the OFDM multi-band bursts are seen and processed like multi-colored bursts with two demultiplexing stages. It can be noted that, to simplify the diagram of FIG. 4, only one sense of transmission has been shown but both senses are of course normally present and can be used.

It will be noted that the system illustrated in FIG. 4 can be applied to a network comprising edge nodes as well as network core nodes. The edge nodes can contain a single source or several sources (on the sending side) and one receiver or several receiver (on the reception side) as shown in FIG. 4, given that to ensure two-way communications, the edge nodes contain a sending part and a reception part. The network core nodes correspond to the combination and/or passive directing functions (without O/E/O conversion) in such a network, implemented by the band combiner, the core node (routing of the multi-colored bursts) and the band separator illustrated in FIG. 4.

Figures 5, 10:
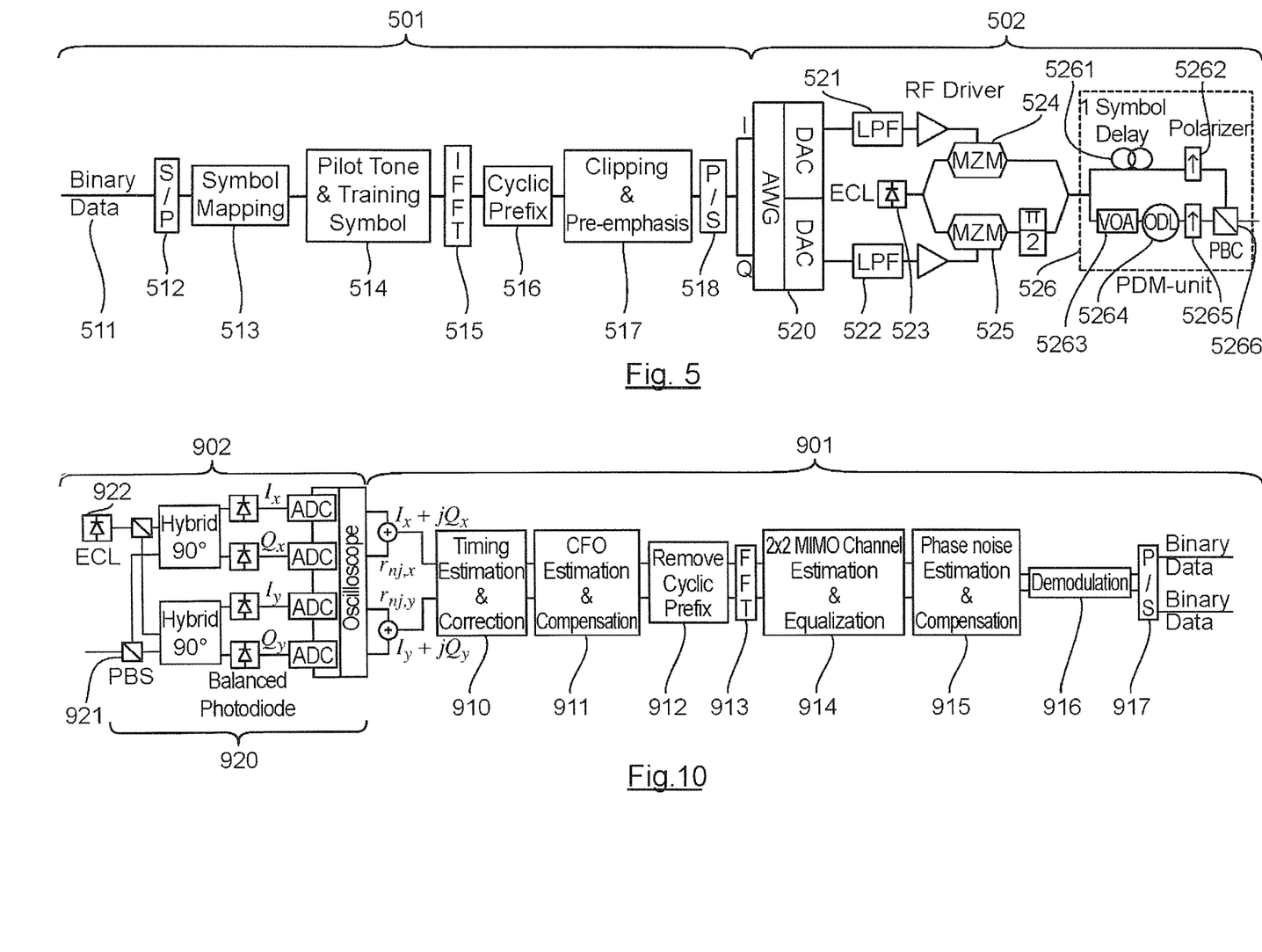
FIG. 5 illustrates a functional diagram of an OFDM single-band sender of the prior art.
FIG. 10 presents a functional diagram of a single-band OFDM receiver of the prior art.

The network of FIG. 4 relies on a solution that uses tuning at source in which the laser used for each band of the OFDM multi-band signal is tunable so as to send out each burst on the wavelength of the destination receiver. A diagram of such a support is shown in FIG. 5. The single-band OFDM emitter of FIG. 5 is constituted by a digital part 501 that processes the digital signal (DSP) required by the OFDM technology and an analog part 502 that converts the data to be transported from the electrical domain to the optical domain.

Pieces of binary data 511 are input into the digital processing part 501. They pass through a series/parallel converter 512 and are then converted into symbols by the "symbol mapping" module referenced 513. Pilot sub-carriers are inserted into the payload sub-carriers by the module referenced 514 which also enables the introduction of reference symbols (also called learning symbols). The processing chain also comprises an IFFT module 515 carrying out an inverse Fourier transform as well as a module referenced 516 enabling the insertion of a cyclic prefix. Such a cyclic prefix transmitted during the guard interval enables the absorption of inter-symbol interference (151). The signal then undergoes clipping and pre-emphasis in the module referenced 517 and then undergoes parallel-series (P/S) conversion 518 at the end of which we obtain the two components of the signal, namely the in-phase I and quadrature Q components of the signal.

In the analog processing sequence 502, the OFDM signal is generated by an analog signal generator 520 (herein represented by a random signal generator (arbitrary waveform generator or AWG) typically used in laboratories). Such a generator 520 comprises especially two digital-analog conversion (DAC) modules enabling the transfer into the analog domain of the two (in-phase and quadrature) components of the OFDM signal generated in the digital domain. Through the two digital-analog converters of the generator 520, the two components I and Q of the OFDM signal are converted into analog signals.

After filtering by a low-pass filter (LPF) 521 and 522 enabling the elimination of the aliasing components, the two components I and Q of the OFDM signal are optically combined by means of an IQ modulator on an optical carrier given by the external cavity emission laser 523. The IQ modulator consists of two Mach-Zehnder type modulators (MZM 524 and 525) parallel-mounted in a Mach-Zehnder superstructure for which the phase difference is 90°.

The optical signal can then undergo biased multiplexing 526 implementing, on a first arm:
  symbol time shift 5261,
  a first polarizer 5262;
and on a second arm:
  a variable optical attenuator (VOA) 5263;
  a optical delay line (ODL) 5264;
  a second polarizer 5265; and
  a polarization beam combiner (PBC) 5266.

This polarization multiplexing is optional, the data sent by the second polarization being sent by a specific OFDM transmitter identical to the one described here above. In any case, the specific architecture of the learning symbols is advantageously complied with on both polarizations in order to enable the polarization separation algorithm to work optimally.

According to one embodiment, the source node sending an OFDM signal on a band associated with it comprises a tunable laser, enabling it to change the sending wavelength. This laser is advantageously tunable rapidly (tuning time of the order of about 100 nanoseconds or less) and can be made with an MG-Y (modulated grating Y-branch) laser as described by J.-O. Wesström et al. in "State-of-the-art performance of widely tunable modulated grating Y-branch lasers" in Proceedings of OFC, 2004, paper TuE2.

However, the line widths of this type of laser can be incompatible (too big) with the line widths required for the generation and above all the (coherent) detection of the OFDM signals. Indeed, OFDM is highly sensitive to phase noise (coming especially from lasers) which prompt inter-carrier interference.

In order to take account of this inconvenience the tunable laser of this source advantageously has a very thin line width (<100 KHz), in order to obtain a very low phase noise. Thus, ideally, the invention uses rapidly tunable lasers with very low phase noise.

One alternative (and possibly complementary) embodiment uses individual lasers (for example external cavity lasers which in addition have the advantage of having very low phase noise) preset on certain wavelengths associated with optical switches having response times of less than 100 ns (for example semi-conductor amplifiers used as optical gates). These lasers and these optical switches can be integrated into a single optical component.

Figure 6:
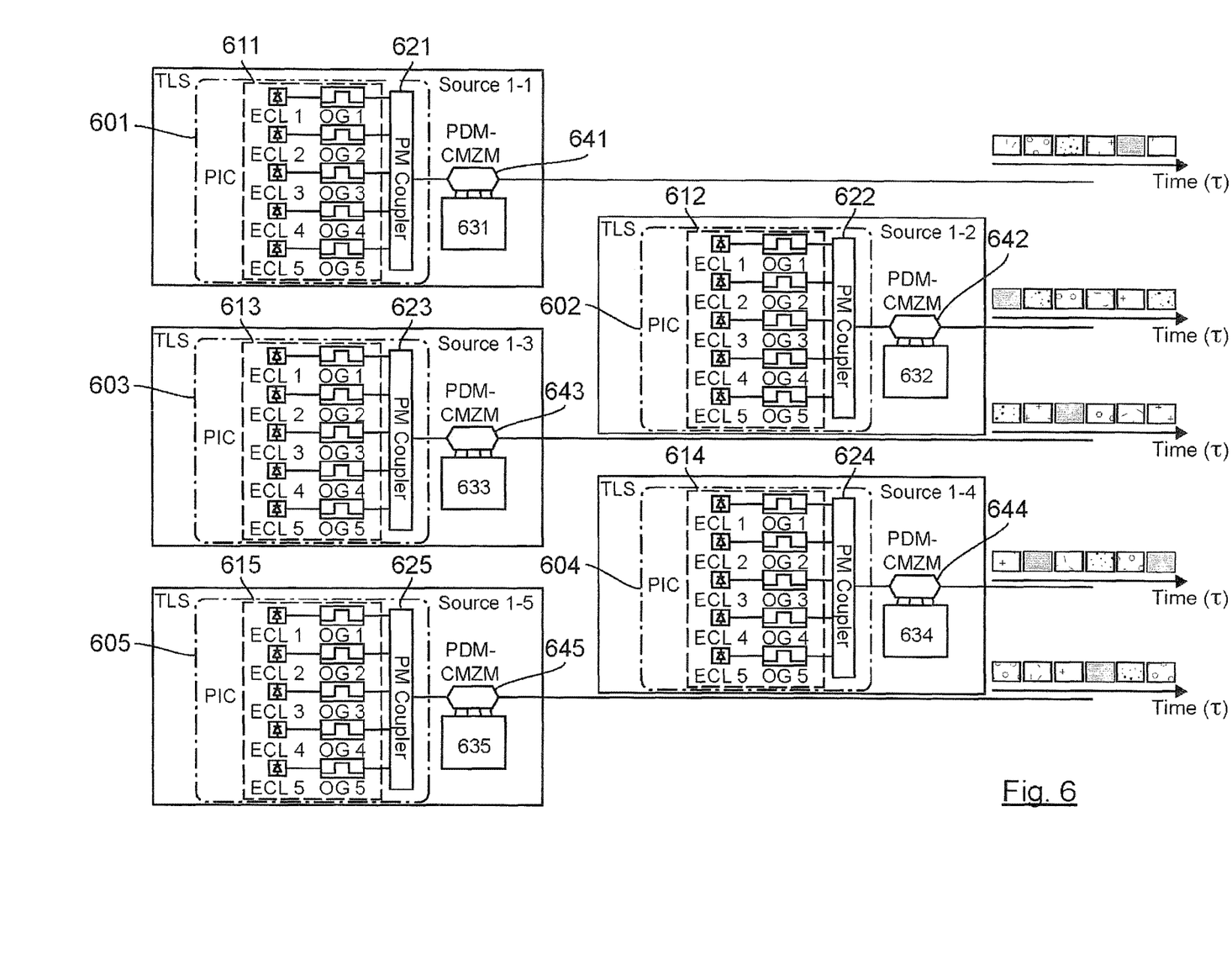
FIG. 6 proposes an example of an embodiment of a multi-band OFDM source according to one embodiment of the invention.

Referring now to FIG. 6, we present an exemplary embodiment of a multi-band OFDM source which is in fact constituted by five tunable single-band sources (for example the sources referenced 1-1 to 1-5 of the optical network of FIG. 4), each of these single-band sources being capable of sending single-band optical bursts on distinct wavelengths.

Each single-band source 1-1 to 1-5 is equipped with a light source enabling the generation of the right wavelength for a given burst. In this case, each source 1-1 to 1-5 is equipped with five external cavity lasers referenced ECL 1 to ECL 5 which constitute an optical generation module capable of delivering optical signals associated with distinct wavelengths, each followed by an optical gate referenced OG 1 to OG 5, for which the opening or closing can be managed by a common controller (not shown) as a function of the wavelength to be used for each data burst.

The outputs of the optical gates referenced OG 1 to OG 5 feed a combination module (for example an optical coupler) PM 621 to 625 at the output of which we therefore obtain a burst of a continuous signal at the source wavelength of one of the external cavity lasers ECL 1 to ECL 5. The fact of using an optical gate (OG) to temporally divide this signal is an interesting alternative to a rapidly tunable source with the required characteristics as indicated above. These ECL sources and these optical gates (OG) can be integrated into a photonic integrated circuit (PIC) referenced 611 to 615. The set of these photonic integrated circuits (each surrounded with lines of dots and dashes in FIG. 6) constitutes the rapidly tunable source (tunable at the burst rhythm) also called a tunable laser source (TLS) and referenced 601 to 605.

Each source 1-1 to 1-5 is also equipped with a device for imprinting (i.e. modulating) on the colored optical signal emitted by the TLS set, the digital data to be transmitted by means of a PDM-CMZM (Polarization Division Multiplexed—Complex Mach-Zehnder Modulator) complex modulator referenced 641 to 645. A polarization modulation can obtain a variation in the bit rate transported by the OFDM bands. In FIG. 6, the data to be transmitted are provided by a processing device (ASIC or application-specific integrated circuit) called an arbitrary waveform generator (AWG) 631 to 635.

Each source 1-1 to 1-5 can therefore provide a signal in the form of data bursts having at the same time different wavelengths and different modulation formats from one burst to another.

Figure 7:
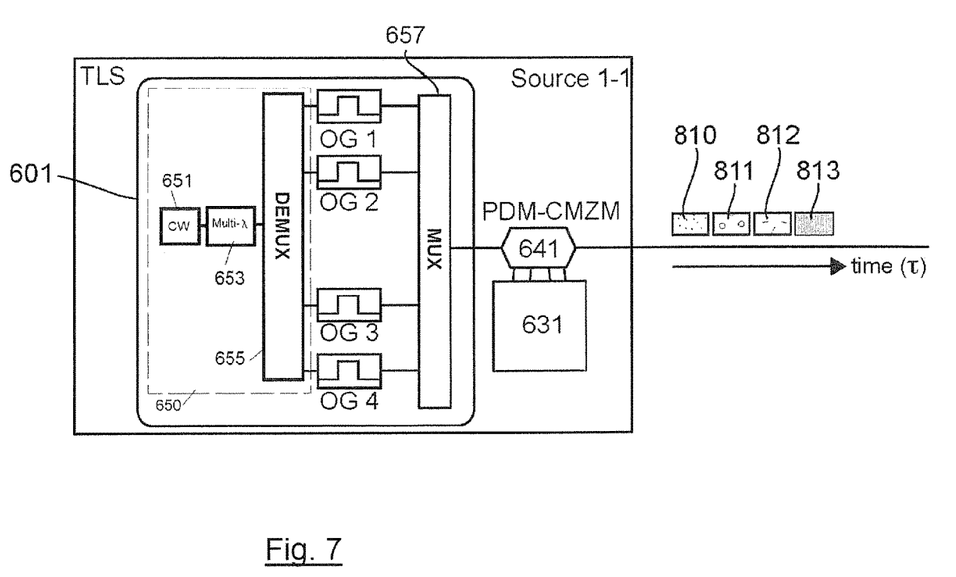
FIG. 7 illustrates a first variant of an embodiment of the example of FIG. 6 that is less costly and more economical in terms of electrical consumption.

Referring now to FIG. 7, we present a variant of the exemplary embodiment of one of the single-band OFDM sources illustrated in FIG. 6 (in this case the source 1-1, chosen purely by way of an illustration) capable of emitting single-band optical bursts on distinct wavelengths (in this case four OFDM single-band successive bursts referenced 810 to 813).

In this variant, instead of using an optical generation module based on five external cavity lasers, the optical generation module comprises:
  a single optical source 651 (typically an external cavity laser with small spectral line width of 50 to 100 kHz) generating a continuous optical signal,
  a multiple wavelength generation module 653, inputting the continuous optical signal output from the light source 651 and outputting, from this continuous optical signal, an optical signal with N wavelengths (in this case N=4 purely by way of an illustration), in other words an optical signal comprising N components associated respectively with these N wavelengths. Such a module can be implemented in the form of a dual-drive Mach-Zehnder modulator on which high RF power is sent at a frequency equal to the spacing desired for the optical lines, in the form of a low-noise passive mode-locked quantum laser or again a phase modulator inserted into a Fabry-Pérot cavity for example.

an optical demultiplexer 655, the input of which receives the multiple wavelength optical signal at output of the multiple wavelength generation module 653, this demultiplexer having N outputs on each of which it separately delivers the wavelength components of the multi-wavelength signal at input.

In this variant, the inputs of the N optical gates OG 1 to OG 5 are then connected to the N outputs of the optical multiplexer 655, each optical gate OG thus processing a single wavelength component of the multiple wavelength signal. The outputs of the N optical gates OG are connected to the N inputs of an optical multiplexer 657, which delivers an optical signal spectrally combining the optical components present at output of these optical gates.

In operation, to the extent that the source 651 gives a continuous signal to the generator module 653 which converts it into a multiple wavelength signal, itself demultiplexed by the demultiplexer 655 towards the N optical gates OG, each of these optical gates OG continuously receives an optical component at a particular wavelength of the multiple wavelength signal. It is enough for only one of these gates to be on (whereas all the other gates are off) for a sufficiently short period of time to obtain a burst at the output of the optical multiplexer 657 on the wavelength of the component processed by the single optical gate OG that is on. The tunability (corresponding to the change in wavelength from one burst to another) is thus ensured by control of the changing of the on gate (among the N optical gates) from a first optical gate associated with a first wavelength to be used for a current burst to a second optical gate associated with a second wavelength to be used for the next burst. As indicated above, this control can be managed by a common controller (not shown) controlling the different optical gates in order to let through a different wavelength component from one burst to another.

Figure 8:
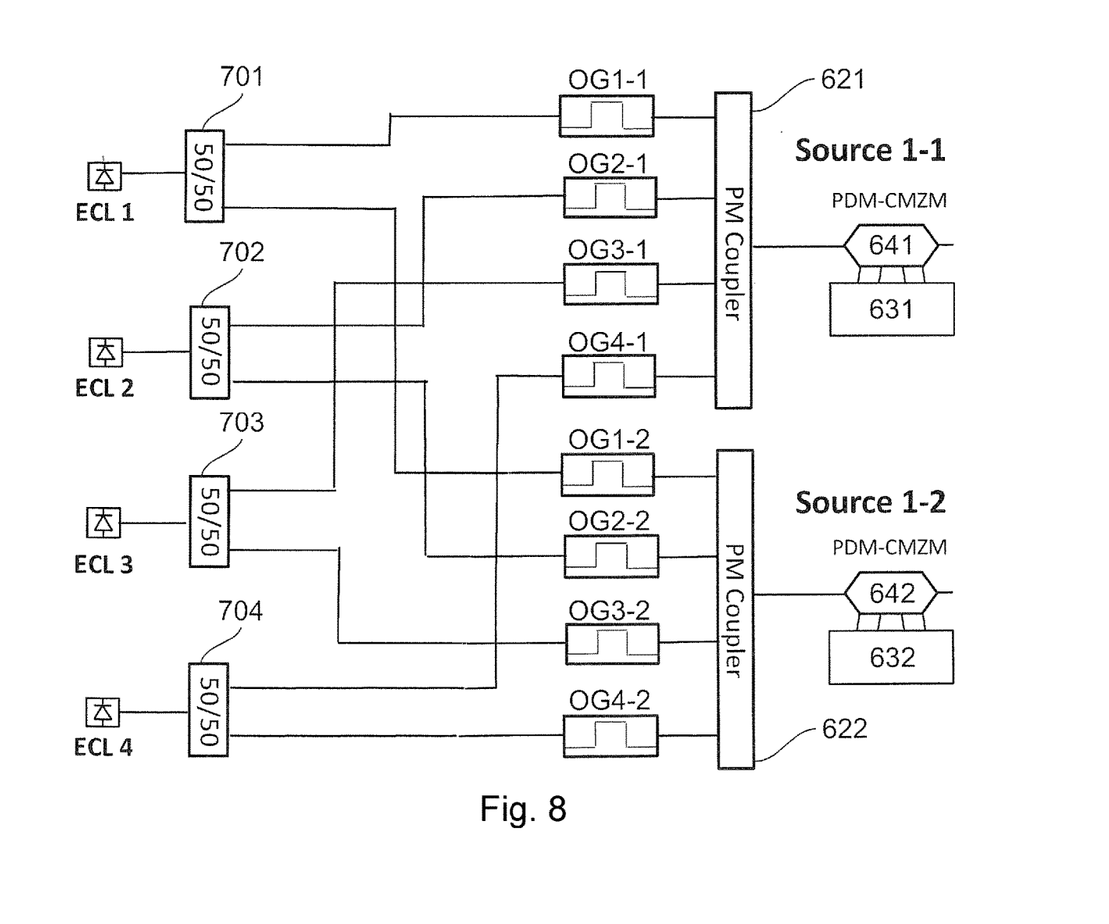
FIG. 8 illustrates a second alternative embodiment of the example of FIG. 6 enabling a pooling of the resources on the sending side.

In another embodiment relying on lower photonic integration, it is possible to pool the ECL sources, which are costly optical components, as shown in FIG. 8.

For the sake of simplification, the figure herein shows only the sources 1-1 and 1-2. The elements identical to those of FIG. 6 are identified by the same references and are therefore not described here in greater detail. As can be seen, only four external cavity lasers ECL 1 to ECL 4 are used and are pooled between the two sources 1-1 and 1-2. To this end, there is an optical coupler 50/50 referenced 701 to 704 at output of each laser ECL 1 to ECL 4. Each coupler 701 to 704 has two outputs, one of which is connected to an optical gate OG1-1 to OG4-1 of the source 1-1 while the other output is connected to an optical gate OG1-2 to OG4-2 of the source 1-2.

It is thus possible to reduce energy consumption as well as the space requirement of these sources.

Figure 9:
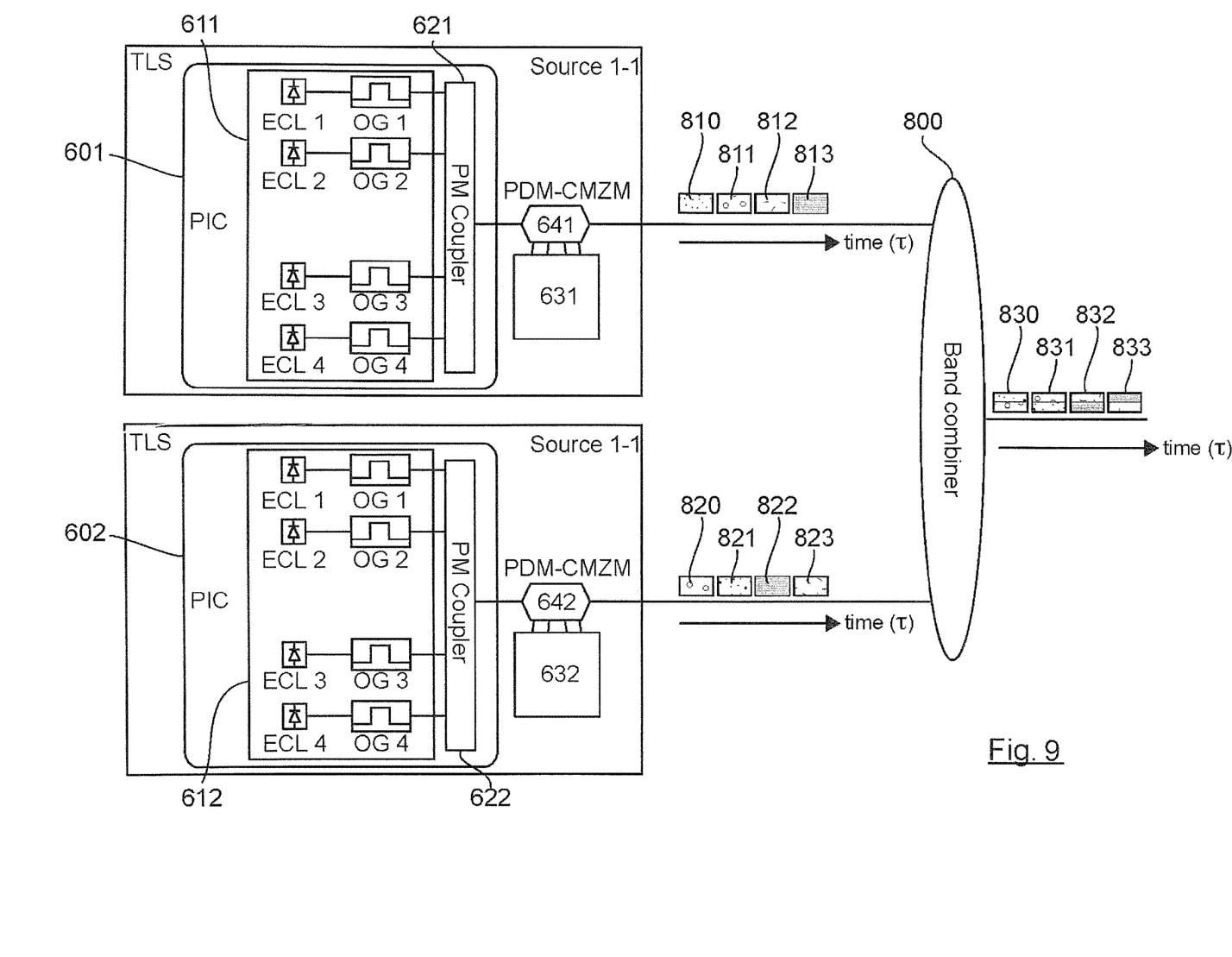
FIG. 9 presents an exemplary embodiment of the band combination module according to one embodiment of the invention.

As shown in FIG. 4 the routing in the optical network in one embodiment of the invention is obtained on the basis of the wavelength, either of an OFDM band (at the extremities of the network) or of an OFDM multi-band signal at the core of the network (i.e. between the band combiner and the band separator). FIG. 9 illustrates the function performed by the band combiner 1 or 2 of FIG. 4. For the sake of simplification, FIG. 9 shows only two sources 1-1 and 1-2, the OFDM single-band data bursts of which are incident to the band combiner 800. Such a band combiner can of course carry out the combining of a greater number of bursts, coming from N distinct sources.

The source 1-1 emits four successive OFDM single-band bursts referenced 810 to 813; the source 1-2 emits four successive OFDM single-band successive bursts referenced 820 to 823; provided that these bursts reach the band combiner 800 in a perfectly synchronized way, this combiner combines them by juxtaposing the spectral bands of each of the bursts to form MB-OFDM bursts referenced 830 to 833. Thus the MB-OFDM bursts referenced 830 corresponds to a combination of the burst referenced 810 corning from the source 1-1 and 820 coming from the source 1-2 and occupies the spectral band with a width equal to the sums of the widths of the spectral bands of the bursts 810 and 820. The same reasoning is applicable for the bursts 831 to 833.

As indicated above with reference to FIG. 4, the management of the sending operations at the sources 1-1 and 1-2 represented in FIG. 8 should make use of a specific control plane taking account of the path time between the sources and the combiner addition to the management function for managing contention within the network and at the destinations).

Given the possibilities offered by multi-band OFDM, it is also possible to obtain variation in the spectral band used by a source so as to offer an additional degree of freedom in the flexibility offered for adapting the granularity of the bandwidth used to the quantity of data to be transported. In this case, the band combiner does not have to be modified because it can be an optical coupler which intrinsically performs no spectral filtering. However, in the band separator 81, 82 shown in FIG. 4, it is in this case necessary to reconfigure the filtered spectral bandwidth. The control plane should then take account of this dimension and perform the necessary actions. In particular, the control plane sends a request to the band separators 81, 82 in order to request them to adapt their filtered spectral band to the width of the OFDM optical band to be demultiplexed. The reconfiguration of the spectral bandwidth at the band separator can be done at a slower rate than when sending. Indeed, it can be supposed that, for a certain duration, a receiver (i.e. a destination or a destination node) receives data at a given bit rate (therefore at a spectral congestion) whereas, at the source, there is a rapid variation of the modulation format (and therefore of the occupied spectral band) when a burst is generated for a destination (with given format and spectral congestion) and, at the next burst, the sending is done to another destination with another modulation and another spectral congestion.

To reconfigure the spectral bandwidth at the band separator at a faster rate it is possible, using the same principle as at the source, to obtain a combination of fixed filters with fast optical gates.

Here below, referring to FIG. 10, a description is provided of an example of a receiver according to one embodiment of the invention. In this example of a solution with tuning at source, the receiver is fixed and it must therefore be capable of detecting the bursts and processing them by means of algorithms dedicated to the reception of OFDM single-band bursts. The single-band OFDM receiver of FIG. 10 is dedicated to the detection of an OFDM single band. It is therefore necessary to have as many OFDM receivers as there are wavelengths conveyed by the network. Should each destination receive only an OFDM band, it corresponds to one receiver per destination.

The receiver is consistent and uses the diversity of the polarization to retrieve the two polarizations of the signal and phase diversity to retrieve the in-phase component (I) and quadrature component (Q). These operations are carried out in the part referenced 902 devoted to the analog processing of the signal. The digital processing of the signal is the same as the one usually done in OFDM (the part referenced 901 of the receiver) and the retrieval of the synchronization, which is a step intrinsic to the processing of the OFDM signal, enables detection of the start of the bursts. To ensure the recovery of the frequency offset between the local oscillator and the emission laser on the bursts, it is desirable that the emission lasers should be properly stable in wavelength and well secured on the ad hoc wavelengths.

More specifically, the received optical signal penetrates a polarization and phase diversity coherent receiver. It then undergoes demultiplexing and polarization 920 implementing a polarization beam splitter (PBS) 921. The two signals retrieved on the X and Y polarization are then mixed by means of a hybrid 90° mixer with the local oscillator 922, the wavelength of which is identical to the wavelength of the laser used when sending but independent of this laser. The two 90° hybrid mixers placed on the X and Y polarizations respectively are used to separate the in phase component I from the quadrature component Q thus enabling the detection of the OFDM signal.

The four components of the signal (I and Q on the X polarization, I and Q on the Y polarization) thus obtained are filtered and converted into the digital domain by means of four analog/digital converters (ADC), the bandwidth of which is adapted to the width of the OFDM bands to be processed. These four ADCs can be embedded in an ultra-fast ASIC (for example 64 Giga-sample/s) or in an ultra-high fast sampling oscilloscope for example.

The digital signal obtained at output of the oscilloscope is then synchronized 910 (in order to determine the start of the OFDM symbols) and the frequency offset of the signal after synchronization is estimated and compensated for 911 in a carrier frequency offset compensation module. This frequency offset between the laser when sending and that of the detection results from the use of coherent detection.

The digital processing chain 901 then classically carries out the following processing operations on the signal:
- elimination of the cyclic prefix 912;
- fast Fourier transform FFT 913;
- channel estimation and equalization 914 to separate the X and Y polarization components;
- estimation of the phase noise and compensation 915;
- demodulation 916;
- parallel/series P/S conversion 917 at the end of which the binary data are retrieved.

It will be noted that throughout this document, the term burst has been used with a single meaning. Similarly, the terms source, source node and emitter are equivalent as are the terms "destination", "recipient", "receiver" and "destination node".

The invention claimed is:

1. System for sending data in an optical network comprising a plurality of optical nodes, characterized in that it comprises:
   - a plurality of source nodes (1-1, 1-2, 1-3, 1-4, 1-5), a source node being configured to generate, in a spectral band that is associated with it, a multi-carrier optical data signal obtained by modulation of a source signal at a source wavelength and to send said multi-carrier optical data signal in the form of single-band data bursts (11-13, 21-23, 31-33, 41-43, 51-53) that can be associated with distinct source wavelengths, a single-band data burst corresponding to a time sub-division of said multi-carrier optical data signal and occupying a time slot,
   - a combination module (1,2) for combining said single-band data bursts, sent by said source nodes in said spectral bands that are associated with them, into multi-band data bursts (61-63, 71-73) occupying a spectral band corresponding to a juxtaposition of said spectral bands associated with the source nodes, and a time slot corresponding to the time slot of said single-band data bursts, and in that it comprises at least one control unit for controlling an instant of sending of said single-band data bursts by said source nodes, implementing a control plane taking account of a path time of said single-band data bursts sent by said source nodes to said combination module, said control unit being configured to have the single-band data bursts reach said combination module synchronously.

2. System for sending data according to claim 1 characterized in that, for a given source node, said single-band data bursts are of variable duration.

3. System for sending data according to claim 1 characterized in that, for a given source node, said single-band data bursts can be associated with multi-carrier optical data signals having different modulation formats.

4. System for sending data according to claim 1 characterized in that, for a given source node, said single-band data bursts can be associated with different data transmission bit rates.

5. System for sending data according to claim 1, characterized in that said source wavelength associated with a single-band data burst is a wavelength dedicated to a destination node of said single-band data burst.

6. System for sending data according to claim 1, characterized in that one of said source nodes comprises a tunable laser.

7. System for sending data according to claim 1, characterized in that one of said source nodes comprises at least two external cavity lasers (ECL1-ECL5) each generating a source signal at a predetermined source wavelength that is proper to it and at least two optical switches, capable of working as optical gates (OG1-OG5) at output of said external cavity lasers, capable of temporally sub-dividing said source signals.

8. System for sending data according to claim 7, characterized in that said external cavity lasers are common to at least two of said source nodes.

9. System for sending data according to claim 1, characterized in that said spectral band associated with one of said source nodes is variable.

10. System for sending data according to claim 1, wherein said control plane implements an exchange of messages between said optical nodes and said at least one control unit, characterized in that said at least one control unit comprises means for computing a duration of said single-band data bursts from a piece of information on spectral bandwidth associated with one of said source nodes inserted into a message exchanged between said source node and said control unit.

11. System for sending data according to claim 1, wherein said control plane implements an exchange of messages between said optical nodes and said at least one control unit, characterized in that said at least one control unit comprises means for computing said instant of sending from parameters of transmission of a single-band data burst by one of said source nodes, said parameters of transmission being contained in at least certain of said exchanged messages.

12. System for sending data according to claim 9, wherein said control plane implements an exchange of messages between said optical nodes and said at least one control unit, characterized in that, since the width of the spectral band associated with one of said source nodes is variable, said control plane comprises command messages sent to at least one intermediate node of the network comprising a piece of information on a current bandwidth for said source node.

13. Method for sending data in an optical network comprising a plurality of optical nodes, characterized in that it comprises:
- at least two steps for generating, in two independent spectral bands, a multi-carrier optical data signal obtained by modulating a source signal at a source wavelength;
- at least two steps for sending said multi-carrier optical data signal in the form of single-band data bursts that can be associated with distinct source wavelengths, a single-band data burst corresponding to a time sub-division of said multi-carrier optical data signal and occupying a time slot;
- a step for combining said single-band data bursts into multi-band data bursts occupying a spectral band corresponding to a juxtaposition of said independent spectral bands, and a time slot corresponding to the time slot of said single-band data bursts;
- a step for controlling an instant of sending said single-band data bursts, implementing a control plane taking account of a path time of said single-band data bursts between said sending steps and said combination step and configured to synchronize said single-band data bursts at an entrance of said combination step.

14. Optical network comprising:
a plurality of source nodes,
- a source node configured to generate, in a spectral band associated with it, a multi-carrier optical data signal obtained by modulation of a source signal at a source wavelength and to send said multi-carrier optical data signal in the form of single-band data bursts that can be associated with distinct source wavelengths, a single-band data burst corresponding to a time sub-division of said multi-carrier optical data signal and occupying a time slot,
- at least one module for combining said single-band data bursts, sent by certain of said source nodes in said spectral bands that are associated with them, into multi-band data bursts, occupying a spectral band corresponding to a juxtaposition of said spectral bands associated with the source nodes, and a time slot corresponding to the time slot of said single-band data bursts,
- a control unit for controlling an instant of sending of said single-band data bursts by said source nodes, implementing a control plane taking account of a path time of said single-band data bursts sent by said source nodes to said at least one module for combining, said control unit being configured to have the single-band data bursts reach said module for combining synchronously;
- at least one core node (7) for the passive routing of said multi-band data bursts, configured to direct said multi-band data bursts as a function of said associated source wavelengths;
- at least one band separator module, configured to separate said multi-band data bursts into a plurality of single-band data bursts and to direct said single-band data bursts as a function of their associated source wavelength towards a destination node to which said source wavelength is dedicated;
- a plurality of destination nodes (2-1, 2-2, 2-3, 2-4, 2-5) of said single-band data bursts.

15. The system for sending data according to claim 1 wherein at least one of the plurality of source nodes comprise a tunable single-band optical source (1-1), comprising:
- an optical generation module (650) delivering a plurality of optical signals associated with a plurality of distinct source wavelengths;
- a plurality of optical gates (OG1,OG2,OG3,OG4) respectively receiving said optical signals associated with the different source wavelengths,
- a module (621,657) for combining outputs of said optical gates;
- a modulator (641) laid out to modulate an optical signal at an output of the module for combining, and wherein said tunable single-band optical source is configured to send single-band optical bursts associated with distinct source wavelengths (810, 811, 812, 813), where a single-band data burst corresponds to a time sub-division of said optical signal modulated by said modulator and occupying a time slot.

16. The system for sending data according to claim 15, characterized in that the optical generation module (650) comprises:
- an optical source (651) generating a continuous optical signal;
- a multiple wavelength generation module (653) laid out to deliver, from the continuous optical signal output received from the optical source, a multiple wavelength optical signal having a plurality of optical components respectively associated with said distinct source wavelengths; and
- a demultiplexer (655) laid out to separate the multiple wavelength optical signal into a plurality of single-wavelength optical signals corresponding to said optical components.

17. The system for sending data according to claim 15, wherein said tunable single-band optical source is configured to send said single-band optical bursts through control of only one of said optical gates to be on during said time slot.

* * * * *